(12) United States Patent
Ida et al.

(10) Patent No.: US 8,008,814 B2
(45) Date of Patent: Aug. 30, 2011

(54) SLIDING SYSTEM WITH ONBOARD MOVING-COIL LINEAR MOTOR

(75) Inventors: Eiji Ida, Kanagawa-ken (JP); Satoshi Sasaki, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 188 days.

(21) Appl. No.: 12/395,248

(22) Filed: Feb. 27, 2009

(65) Prior Publication Data

US 2009/0230785 A1    Sep. 17, 2009

(30) Foreign Application Priority Data

Mar. 12, 2008  (JP) .................................. 2008-062311
Mar. 12, 2008  (JP) .................................. 2008-062358

(51) Int. Cl.
*H02K 41/02* (2006.01)
*H02K 41/025* (2006.01)
*H02K 41/03* (2006.01)
*H02K 41/035* (2006.01)
*H02K 33/00* (2006.01)

(52) U.S. Cl. ................ 310/12.21; 310/12.31; 310/12.22; 310/12.23; 310/12.05

(58) Field of Classification Search ............... 310/12.05, 310/12.31, 12.32, 12.21, 12.22, 12.23; *H02K 41/02, H02K 41/025, 41/03, 41/035, 33/00*

See application file for complete search history.

(56) References Cited

U.S. PATENT DOCUMENTS

| 3,895,585 | A  | * | 7/1975  | Schwarzler    | 310/12.31 |
| 5,072,144 | A  | * | 12/1991 | Saito et al.  | 310/12.28 |
| 5,825,104 | A  | * | 10/1998 | Kondo et al.  | 310/12.27 |
| 6,348,746 | B1 | * | 2/2002  | Fujisawa et al. | 310/12.31 |
| 6,664,665 | B2 | * | 12/2003 | Hsiao         | 310/12.14 |
| 7,133,115 | B2 | * | 11/2006 | Nawata et al. | 310/12.05 |
| 7,202,584 | B2 | * | 4/2007  | Ida           | 310/156.32 |
| 2003/0197850 | A1 | * | 10/2003 | Sekiguchi  | 310/12 |

FOREIGN PATENT DOCUMENTS

| JP | 2001 025229 A | 1/2001 |
| JP | 2007 300759 A | 11/2007 |

* cited by examiner

*Primary Examiner* — Tran N Nguyen
*Assistant Examiner* — Michael Andrews
(74) *Attorney, Agent, or Firm* — Browdy and Neimark, PLLC

(57) ABSTRACT

A sliding system with onboard moving-coil linear motor is disclosed in which an armature assembly is a printed-circuit board, armature windings of flat configuration and coil stay having a stay and any number of cores made integral with the stay. The armature assembly is held by virtue of the stay at a preselected location inside an interval defined between field magnet arrays and, therefore, is small and compact in height in transverse section. A bed formed in an angled hook-like configuration in a transverse section contributes to shrinkage of the sliding system in either of height and width in transverse section or most compactness of the sliding system in transverse dimension. Moreover, the bed can be selected in length at discretion according to the purpose of usage to provide any desirable stroke length for a single table of a preselected length, getting the sliding system convenient for usage.

1 Claim, 7 Drawing Sheets

SLIDING SYSTEM WITH ONBOARD MOVING-COIL LINEAR MOTOR

FIELD OF THE INVENTION

The present invention relates to a sliding system with onboard moving-coil linear motor, which is adapted to be used in fields as diverse as semiconductor industries, various assembling machines, precise measuring/inspection equipments, testing machines, machine tools, and so on.

BACKGROUND OF THE INVENTION

Recent sliding systems with onboard linear motor are finding extensively increased applications in various machines including semiconductor industries, various assembling machines, precise measuring/inspection equipments, testing machines, machine tools, and so on. The sliding systems are needed to be shrinking in size, compact and simple in construction, and yet having high propulsion, superior accuracy, high durability, high reliability, convenience to operate, less consumption of power and inexpensive cost in production. Moreover, the linear motion guide units having mounted with the sliding system constructed as stated earlier require maintenance-free for lubrication. To cope with the design considerations as stated earlier, there has been developed various sorts of sliding systems with onboard linear motor. Nevertheless, advanced machines are looking for the improved sliding system with onboard linear motor which, even though more shrinkage in construction, allows the slider moving over a longer stroke than ever with even more shrinkage in size, and finds more applications in extensive fields as well as more conveniences for usage.

An example of the sliding system with onboard moving-magnet linear motor is disclosed in, for example Japanese Laid-Open Patent Application No. 2007-300 759 which is a commonly-assigned senior application. This prior sliding system includes an elongated flat bed, a flat table overlying above the bed so as to move back and forth through linear motion guide units in a reciprocating manner along a direction longitudinally of the bed, a field magnet lying on the table in opposition to the bed, the field magnet being composed of magnet segments lying in a way unlike magnetic poles are juxtaposed alternately in polarity in a traveling direction of the table, and an armature assembly lying on the bed in opposition to the field magnet, the armature assembly being composed of coreless armature windings of flat rectangle in shape, which are arranged in juxtaposition in a direction longitudinally of the bed. With the prior sliding system constructed as recited earlier, the bed is made of magnetic material so as to serve as a winding yoke for magnetic circuit, while table is also made of magnetic material to serve as a magnet yoke for magnetic circuit. The armature assembly is made up of any number of armature windings lying in juxtaposition on an upper surface of elongated flat plate mounted on the bed, the armature windings being packaged with any adhesive molding applied around the armature windings. The prior sliding system was then expected of longer traveling stroke of the slider than ever, with high velocity running and high response, and shrinkage in construction.

To envisage the sliding system in which the stroke of the slider is even longer, it would be anticipated to extend lengthwise the table installed thereon with a linear scale or alternatively install the linear scale on the bed while elongate bed in length. For example, when the latter alternative is selected, the armature windings are arranged across the overall length of the bed. Every other armature windings but the ones opposing against the field magnet on the table would be energized at all times. This involves additional electricity and entails generation of much heat. Thus, it will be understood that either of the alternatives would have a limitation in potential stroke length of the slider.

Moreover, an example of the sliding system with onboard moving-coil linear motor is disclosed in, for example Japanese Laid-Open Patent Application No. 2001-25 229 which is also a commonly-assigned senior application. This prior sliding system is comprised of a linear motion guide unit having a guide rail of U-shape in transverse section, which has high rigidity enough to function as structural member, and a slider that fits into a U-shape recess inside the guide rail for sliding movement relatively to the guide rail, and a moving-coil linear motor actuating the slider to travel with reference to the guide rail. The moving-coil linear motor has a pair of field magnets installed on a magnet yoke lying on an outward surface of any one of widthwise opposing sides of the guide rail, and a moving-coil assembly secured to the slider in a way lying between the paired field magnets. The magnet yoke has a U-shape configuration in transverse section, which is defined with lengthwise sections opposite to one another and connected with each other along their bottom lengthwise edges. The magnet yoke is attached on the selected side of the guide rail in an orientation getting the U-shape opened upwards. The moving-coil assembly is fastened to a sidewise extension of a mounting base secured to the top of the slider, which is raised above the sides of the guide rail. With the moving-coil assembly, the armature windings are each made up of turns wound around a core of resinous molding, which fits to a coil board in a complementary mating manner to set securely in place the armature assembly relatively to the coil board.

The prior sliding system constructed as stated just earlier, however, wouldn't avoid getting too high or bulky in transverse section to more shrink in size. Industry is eager for the sliding system less in height than ever so as to make it possible to incorporate with miniature machines.

SUMMARY OF THE INVENTION

The present invention has as its primary object to meet industry's demand as stated earlier with the linear motor in which the moving element isn't a moving magnet, but a moving coil and, more particularly, to provide a miniature sliding system with onboard moving-coil linear motor in which an armature assembly is made compact and simple in construction, and a bed having a field magnet to carry the armature assembly thereon for linear movement is correspondingly made compact and simple in construction. Especially, the present invention provides a sliding system with moving-coil linear motor in which a bed made compact and simple in construction serves the function of magnet yoke and has the field magnet to support the armature assembly thereon for linear movement while the armature assembly is correspondingly rendered compact and simple in construction, and yet having high propulsion, superior accuracy, high durability, high reliability, convenience to operate, less consumption of power and inexpensive cost in production.

The present invention is concerned with a sliding system with onboard moving-coil linear motor, comprising an elongated bed functioning as a magnet yoke, a table movable for reciprocating motion in a lengthwise direction of the elongated bed by virtue of a linear motion guide unit, a pair of field magnet arrays lying inside surfaces of the magnet yoke opposite to one another, one to each inside surface, the paired field magnet arrays having magnetic poles which are laid on the inside surfaces of the magnet yoke in a way unlike magnetic poles are juxtaposed alternately in polarity in the lengthwise direction of the elongated bed and also any one magnetic pole on one inside surface of the magnet yoke confronts unlike magnetic pole on the other surface of the magnet yoke, and an armature assembly having armature windings carried on the table to hold a location lying in an interval defined between the field magnet arrays so that a current in the armature windings interacts electromagnetically with a field flux created by the field magnet arrays to force the table moving relatively to the bed; and wherein the armature assembly is comprised of a coil board having a printed-circuit board of flat configuration lying midway between the field magnet arrays and the armature windings lying on the printed-circuit board in juxtaposition in a lengthwise direction of the printed-circuit board, and a coil stay having a stay secured to the table so as to locate out of the interval and magnetic cores made integral with the stay and fit inside winding turns of the armature windings, so that the coil board is carried on the table through the coil stay; and/or wherein the bed is the integral magnet yoke formed in an angled configuration like a hook in a transverse section normal to the lengthwise direction of the bed, the angled hook-like configuration being constituted with a base board of rectangle extending lengthwise of the bed, a ceiling board of rectangle lying in parallel and opposition to the base board at a preselected interval away from the base board, the ceiling board being same in length as the base board, but less in width than the base board, and a side board joining integrally the base and ceiling boards at their lengthwise side edges, and the inside surfaces of the base and ceiling boards opposite to one another across the preselected interval having mounted thereon with the field magnet arrays, and the inside surface of the base board extending sidewise into a shelf lying along a lengthwise other edge widthwise opposite to the joined edge of the base board with the side board to provide a mounting surface for the linear motion guide unit.

In one aspect of the present invention, a sliding system is disclosed in which the armature winding contains winding turns wound in an elliptic configuration each of which has a pair of coil sides lying in parallel with one another to generate electromotive propulsion and curved coil ends connecting the coil sides together.

In another aspect of the present invention, a sliding system is disclosed in which the cores of the coil stay are laid in juxtaposition in the lengthwise direction in a way any adjacent two are spaced away from each other across a preselected interval and joined together to the stay at their root ends to make the coil stay into a construction like comb.

The construction that the coil board is integral with the stay secured on the side of the table is advantageous to making the coil board less in thickness, eventually getting overall the sliding system shrinking in height or compact and simple in dimension.

In a further another aspect of the present invention, a sliding system is disclosed in which the linear motion guide unit is comprised of a guide rail secured to the mounting surface of the bed in a way extending along the lengthwise direction of the bed, and some sliders that fit over or conform to the guide rail for sliding movement by virtue of more than one rolling element, and further the table is fastened to the sliders and has mounted on one side thereof with the stay of the armature assembly.

In a further another aspect of the present invention, a sliding system is disclosed in which there are provided pairs of the beds spaced away from each other, and the table is carried for movement on the beds through a plurality of the sliding systems to provide an XY θ-position control system.

With the sliding system in which the armature assembly is forced to move together with the table having mounted thereon with the slider, selection of any one stationary bed from beds different in length for an only moving table of a preselected length makes it possible to comply with different stroke lengths of the table according to the slider, getting the sliding system convenient for usage. The constructional feature in which the cores of magnetic material fit insider the winding turns of the armature windings contributes to high propulsion, high traveling velocity and high response of the table, less power consumption for desired propulsion. Moreover, the constructional feature that the stay integral with the cores is held together with the coil board on the side of the table contributes to making the coil board less in thickness, eventually getting overall the sliding system shrinking in height, thereby making it easier to render the bed to carry the moving table small in width. Especially, the coil board carried on the integral stay helps narrow down the interval between the field magnet arrays to allow the coil board traveling through there, making it possible to extend the traveling stroke of the table even with small in construction, eventually getting overall the sliding system shrinking in height or compact and simple in dimension. Moreover, the sliding system constructed as stated earlier has high propulsion, superior accuracy, high durability, high reliability, convenience to operate, less consumption of power and inexpensive cost in production.

Furthermore, the integral combination of every core with the stay for the armature assembly makes it possible to render the coil board of the armature assembly less in thickness than ever. As a result, the coil board is held by virtue of the stay at a desired location in the interval between the field magnet arrays with keeping critical spaces away from the field magnet arrays. Thus, the sliding system has high propulsion, irrespective of less in cross-sectional height and compact in dimension in transverse section.

With the sliding system of the present invention, the bed functioning as the magnet yoke is formed to have the angled hook-like configuration in transverse section in which the base board and ceiling board are made integral with one another while the field magnet arrays are laid on the inside surface of the base board and ceiling board opposite to each other. The bed constructed as stated earlier is made small in either of the height and width in transverse section, eventually, compact in transverse dimension thereof. The bed can be selected in length at discretion according to the purpose of usage to provide any desirable stroke length for the table of a preselected length, getting the sliding system convenient for usage.

The guide rail of the linear motion guide unit is arranged on the base board of the bed and the coil board is allowed to move inside the recessed interval of the bed opening beside the guide rail. With the sliding system of the present invention, the interval between the field magnet arrays can be made small or narrow while the bed is made small in width. In addition, the construction that the cores of magnetic material fit insider the winding turns of the armature windings makes certain of high propulsion, high traveling velocity and high response of the table, less power consumption for desired propulsion.

BRIEF DESCRIPTION OF THE DRAWINGS

In FIG. 8(a) a coil stay is shown in perspective; in FIG. 8(b) a coil board is illustrated in perspective; in FIG. 8(c) the armature assembly is illustrated in perspective in a phase in which the coil stay and the coil board fit together into each other; and in FIG. 8(d) a completed armature assembly is in perspective:

DETAILED DESCRIPTION OF THE PREFERRED EMBODIMENTS

Figure 1:
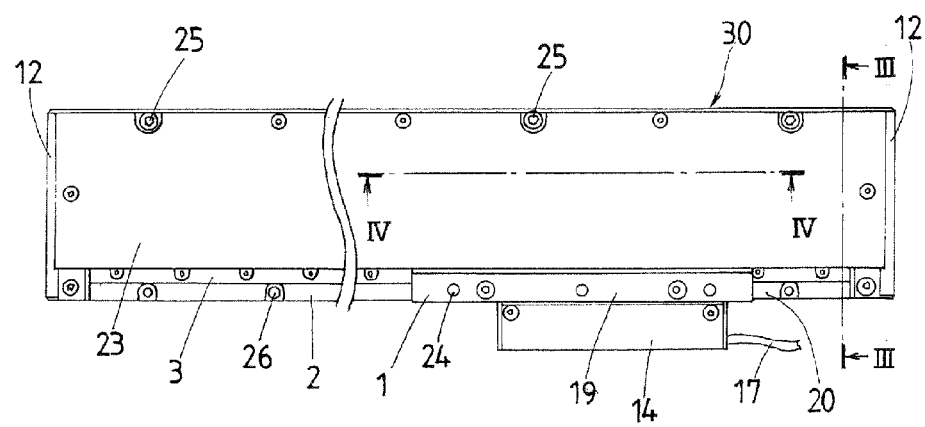
FIG. 1 is a top plan view, partially broken away, showing a preferred embodiment of a sliding system with onboard moving-coil linear motor in accordance with the present invention.
Figure 2:
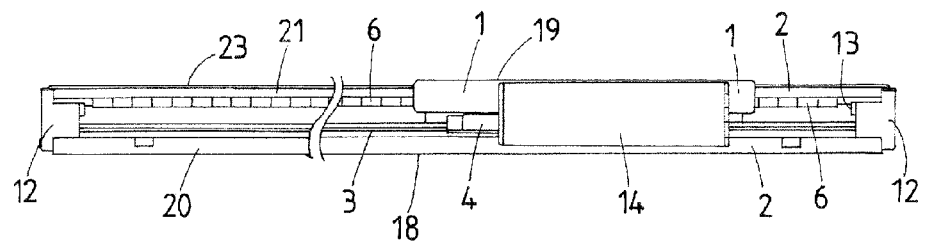
FIG. 2 is a view in front elevation, partially broken away, of the sliding system of FIG. 1.
Figure 3:
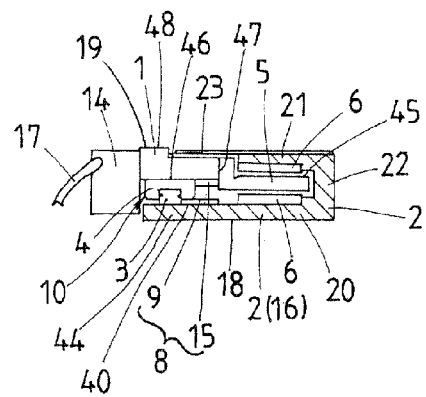
FIG. 3 is a view in transverse section of the sliding system of FIG. 1, the view being taken along the plane of the line •—• of the same figure.

Preferred embodiments of a sliding system according to the present invention will be explained hereinafter in detail with reference to the accompanying drawings. The sliding system with an onboard moving-coil linear motor is envisaged incorporating it in a diversity of machinery including semiconductor manufacturing equipments, various assembling machines, measuring/inspection equipments, testing machines, machine tools, testing instruments, position-control system, sliding table system, and so on. Selection of any one stationary bed from beds different in length for an only moving table of a preselected length as shown in FIGS. 1 to 3 makes it possible to comply with different stroke lengths of, for example 120 mm~300 mm, getting the sliding system convenient for usage.

A sliding system 30 of the present invention as shown in FIGS. 1 to 4 is constituted with an elongated bed 2 to provide an integral magnet yoke 16 which has an angled configuration like a hook in a transverse section thereof, a table allowed to move lengthwise of the bed 2 by virtue of a linear motion guide unit 10, a pair of field magnet arrays 6 which are mounted on inside surfaces of the magnet yoke 16 opposing each other across a recessed interval 45, and an armature assembly 5 carried on the table 1 and including any number of armature windings 7. Each field magnet array 6 has any number of permanent magnetic poles which are arranged in juxtaposition in a way alternating in polarity in a traveling direction of the table 1 and also unlike magnetic poles confront each other across the recessed interval 45. With the sliding system 30 constructed as stated earlier, a current in the armature windings 7 interacts electromagnetically with a field flux created by the field magnet arrays 6 to force the table 1 moving with respect to the bed 2.

Figure 5:
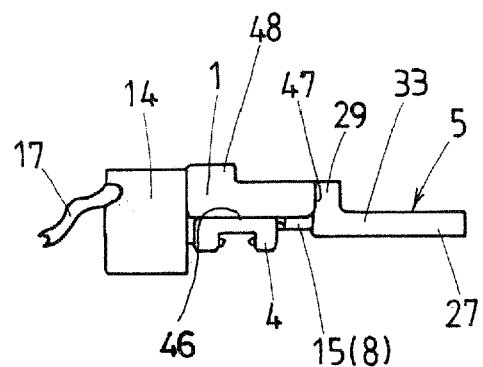
FIG. 5 is a view in front elevation showing a moving element including an armature assembly in the sliding system of FIG. 3.
Figure 6:
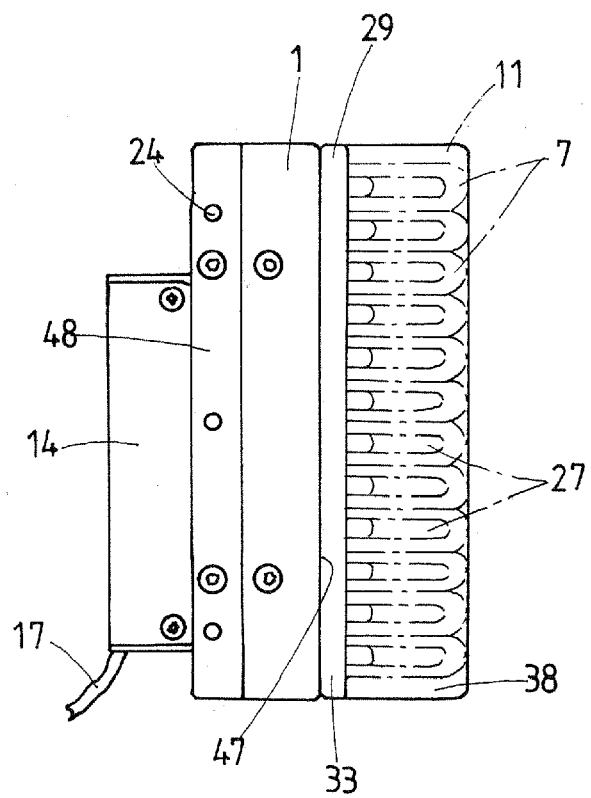
FIG. 6 is a plan view showing the armature assembly of FIG. 5.
Figure 7:
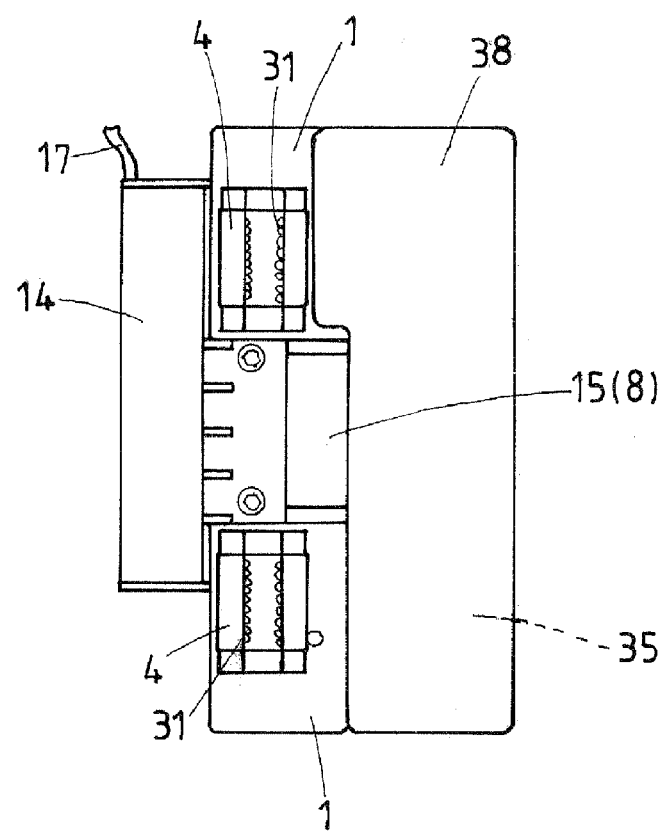
FIG. 7 is a bottom plan view of the armature assembly of FIG. 5.

The linear motion guide unit 10 is envisaged lying on only a lengthwise side edge 44 extending along an open side of the recessed interval 45 inside the bed 2 and comprised of an elongated guide rail 3 that is fastened on a mounting surface 40 made on the lengthwise side edge 44 of the bed 2, and sliders 4 each of which fits over or conform on the guide rail 3 for free sliding movement by virtue of more than one rolling element of ball and so forth (refer to FIG. 7). The table 1 is secured to an upper mounting surface 46 of the slider 4. The table 1 is carried in such a fashion straddling some sliders 4, for example two sliders 4 in the version illustrated here, each of which fits over or conform on the guide rail 3. The table 1 as shown in FIGS. 5 and 6 is shaped into a rectangle to cover overall the mounting surfaces 46 of two sliders 4.

The armature assembly 5, as seen in FIGS. 3 to 6, is composed of a coil board lion which any number of the armature windings 7 are arranged in juxtaposition in the traveling direction of the table 1. The armature assembly 5 is placed inside the recessed interval 45 between the field magnet arrays 6 so as not to touch any field magnet arrays 6, but separating away from either of the field magnet arrays 6 to leave air gaps. Moreover, the armature assembly 5 is raised sidewise out of the recessed interval 45 across the open side of the recessed interval 45. A stay 29 is secured by means of fastening bolts to a lengthwise edge of the coil board 11. Electromagnetic interaction between the current in the armature windings 7 and the field flux created by the field magnet arrays 6 causes the coil board 11 to travel lengthwise of the recessed interval 45 thereby to drive the table 1 in a sliding manner.

Figure 9:
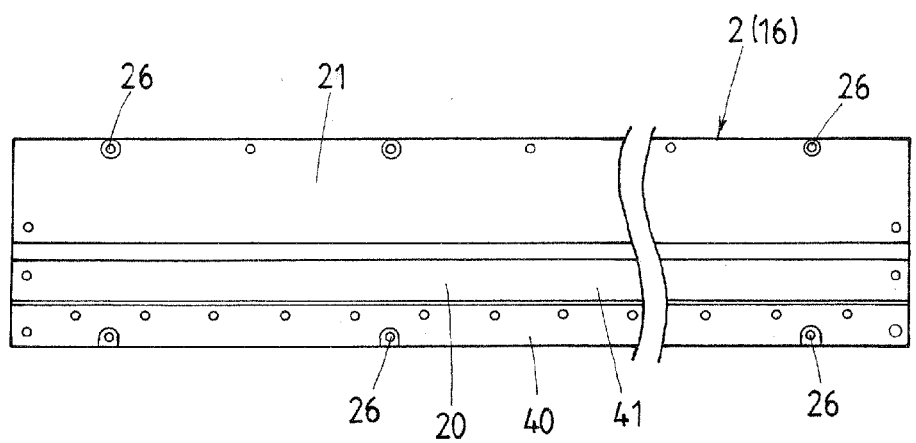
FIG. 9 is a top plan view, partially broken away, of a bed in the sliding system of FIG. 1.
Figure 10:
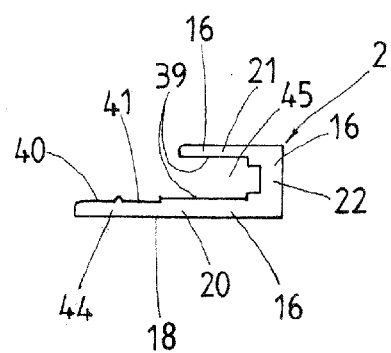
FIG. 10 is a view in side elevation of the sliding system of FIG. 9.

With the sliding system 30 of the present invention, the bed 2 as shown in FIGS. 9 and 10 is made integrally in the magnet yoke 16 to render the sliding system less in height in transverse section. The bed 2 is made of magnetic material contributable to the magnet yoke 16 and formed in the angled configuration like a hook in a transverse section normal to the longitudinal direction of the bed 2. The angled configuration of the magnet yoke 16 is defined with a base board 20 of rectangle extending lengthwise of the bed 2, a ceiling board 21 of rectangle lying in parallel and opposition to the base board 20 at a preselected interval away from the base board 20, and a side board 22 joining integrally the base and ceiling boards 20, 21 at their lengthwise side edges. The base board 20 is provided on the underneath thereof with a mounting surface 18 that is used to secure the sliding system to the machine base and so on. The ceiling board 21 is same in length as the base board 20, but less in width than the base board 20. With the bed 2 constructed as stated earlier, especially, inside surfaces 39 of the base and ceiling boards 20, 21 are opposite to one another to provide confronting surfaces 39 of the magnet yoke 16. Of the inside surfaces 39 confronting each other, only the inside surface 39 of the base board 20 extends sidewise into a shelf 44 lying along the lengthwise other edge widthwise opposite to the joined edge of the base board 20 with the side board 22. The linear motion guide unit 10 is carried on the shelf 44 in a fashion lying side by side with the armature assembly 5. The shelf 44 of the bed 2 further has a strip surface 41 to set a linear scale 9 on the same surface as the inside surface 39 in adjacency of the mounting surface 40.

With the sliding system 30 having the elongated bed 2 of flat rectangle formed in the angled configuration like a hook in a transverse section normal to the longitudinal direction, a moving-coil linear motor is comprised of the magnet yoke 16 that is made in the angled hook-like configuration extending lengthwise along any one side of the bed 2, and the table 1 that is actuated to provide accurate position control through the linear motion guide unit 10 lying on the shelf 44 which extends lengthwise along the other side of the bed 2. The sliding system constructed as stated earlier is less in either of height and width in transverse section than ever and also most compact in transverse dimension. Selection of any one bed or guide rail 3 in conformity with the purpose of usage from beds 2 different in length makes it readier to provide any desirable stroke length for a single slider 4 or the moving table 1 of a preselected length, getting the sliding system convenient for usage. With the sliding system having the transverse section of height: 16 mm×width: 45 mm, for example, the stroke length of the table 1 may fit any preset constructions of 120 mm, 180 mm, 240 mm and 300 mm.

The sliding system 30 of the present invention as shown in FIGS. 3, 5 and 7 has a linear encoder 8 to sense the position of the table 1 with respect to the bed 2. The linear encoder 8 is made up of a linear scale 9 lying on the strip surface 41 extending along a lengthwise zone more middle-ward or more inwards than the mounting surface 40 to secure the guide rail 3 on the bed 2, and a sensor 15 fastened the underneath of the table 1 by the side of the slider 4 while in opposition to the linear scale 9. A shield 23 is provided over the upper side of the sliding system 30 to prevent any foreign materials from getting inside the recessed interval 45 between the field magnet arrays 6 and inside the encoder 8. The shield 23 is made of a stain-proof rectangular sheet of stainless steal and so on and mounted on the ceiling board 21 with fastening bolts to generally cover the overall upper area of the bed 2 across the ceiling board 21 not only the upper of the table 1. The sliding system 30 or the bed 2 is closed at lengthwise opposite ends thereof with end closures 12 of resinous molding to divert foreign materials from entering inside the sliding system 30. The end closures 12 function at their inside thereof as stoppers 13 to stop the linear motion of the slider 4. The slider 4 has a rectangular shape in plan while an L-shape in transverse section, in which a top surface thereof lying face-to-face with the shield 23 is raised partially above the shield 23 on the farther outside than the sideward edge of the shield 23 to form a land 48 prominent slightly above the upper surface of the shield 23 in such a fashion not to touch the shield 23 but to leave a little clearance between them. The top surface of the prominent land 48 serves as a mounting surface 19 with threaded holes 24 that are used to fasten any object such as a workpiece or the like to the mounting surface 19. On the other hand, the bed 2 has bolt holes 25 and 26 that are used to fasten the bed 2 to the machine base 42. On the outermost side edge of the table 1, there is mounted a connector stay 14 for a junction box to wire a signal line from the sensor 15, a power line of the armature windings 7, and so on. A cord 17 extending out of the connector stay 14 is to hold together a variety of lines as stated just earlier and reaches a desired location such as a driver unit.

Figure 8:
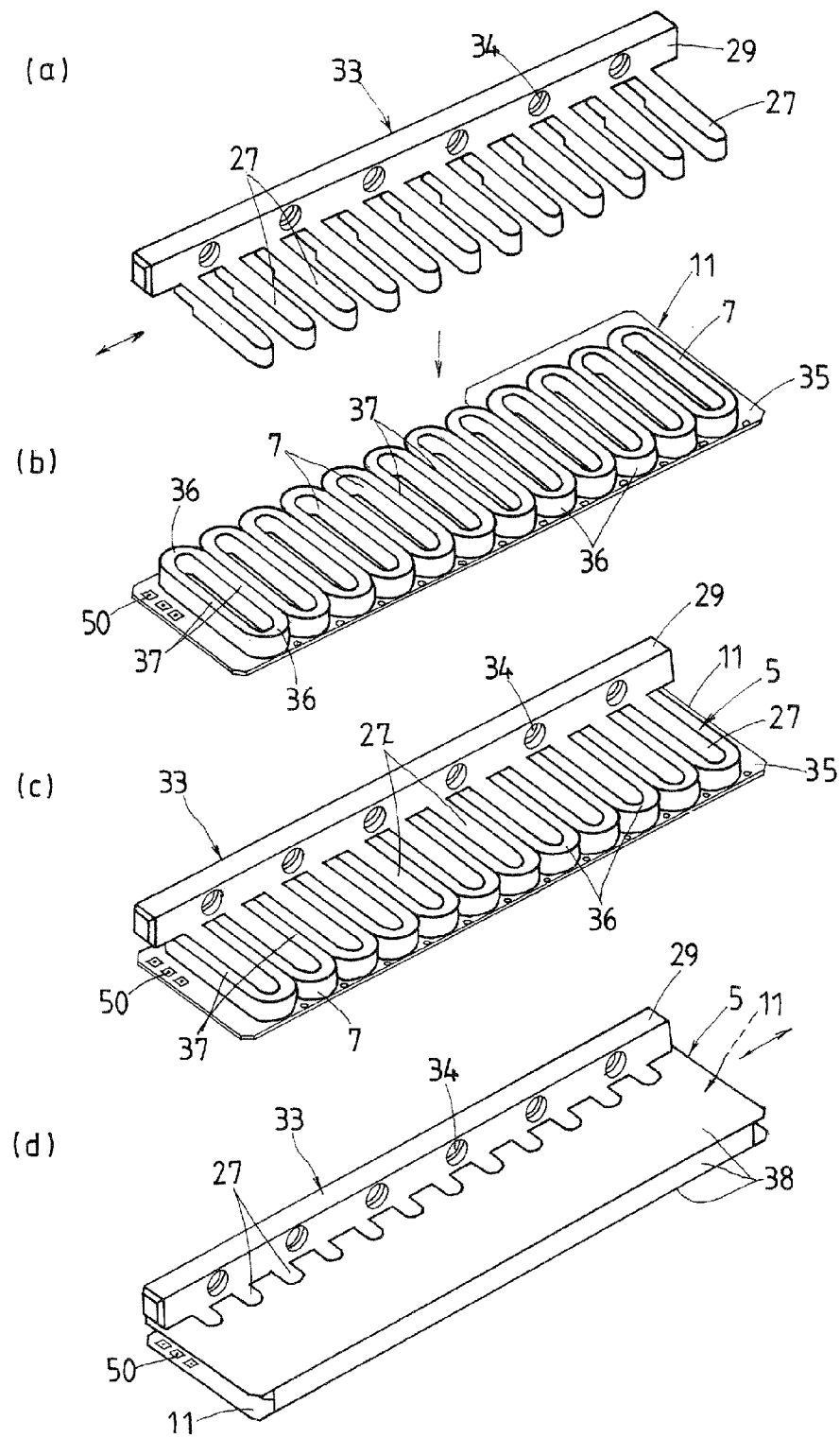
FIG. 8 is a perspective view of the armature assembly of FIG. 3, in which the armature assembly is shown taken apart to easily explain how the armature assembly is made up.

Referring to FIGS. 4 to 8, there is shown the armature assembly 5 installed in the sliding system of the present invention. The armature assembly 5 is generally composed of a coil stay 33 and the coil board 11. The coil stay 33 has the stay 29 raised outwards beyond the field magnet arrays 6 lying inside the magnet yoke 16. The armature assembly 5 is secured along the stay 29 to the inmost side edge 47 of the table 1 by means of fastening bolts. The coil board 11, although continuing with the stay 29, is made in flat rectangle to shrink the height in transverse section so as to make it possible to enter the narrow interval 45 between the field magnet arrays 6. The coil board 11 is constituted with a printed-circuit board 35 and a plurality of flat armature windings 7 of flat rectangular shape lying on the printed-circuit board 35 in juxtaposition in the sliding direction of the table 1. Every armature winding 7 is a cored armature winding suited for high propulsion, in which a core 27 of magnetic material fits into winding turns. With the armature assembly 5 constructed as stated earlier, each core 27 of magnetic material has to be firmly supported at their preselected locations so as not to incur appreciable bending or deflection caused by any magnetic attraction of the field magnet arrays 6. Moreover, every core 27 as shown in FIG. 8 is made integrally with the common stay 29 to make the armature assembly 5 less in height. Thus, the coil stay 33 is made in one united construction of every core 27 with the common stay 29. With the coil stay 33 made as stated just earlier, the cores 27 are laid in juxtaposition in the sliding direction of the table 1 in a way any adjacent two are spaced away from each other across a preselected interval, and joined together to the common stay 29 at their root ends. Overall, the coil stay 33 has a construction like comb.

The armature winding 7 as shown in FIG. 8 contains winding turns wound in a flat elliptic configuration each of which has a pair of coil sides 37 and 37 lying in parallel with one another to generate electromotive propulsion, and curved coil ends 36 connecting the coil sides 37 together. The armature windings 7 are arranged in juxtaposition in the sliding direction of the table 1 on the printed-circuit board 35 in a fashion their coil sides 37 are laid in orientation perpendicular to the sliding direction of the table 1. The winding turns of the armature windings 7 snugly fit over or conform to the elongated elliptic cores 27, one to each core. With the armature assembly 5 of the present invention, the coil board 11 as shown in FIG. 8($b$) contains the printed-circuit board 35 and twelve pieces of the armature winding 7 lying on the printed-circuit board 35 while there is provided the coil stay 33 as shown in FIG. 8($a$) in which twelve pieces of the core 27 are integral with the common stay 29. As shown in FIG. 8($c$), the coil stay 33 is combined or assembled together with the coil board 11 in such a construction that the cores 27 fit into their associated windings 7 and get secured to the winding 7 with any adhesive. As shown in FIG. 8($d$), a protective sheet 38 is applied to cover entirely the outside surface of the coil board 11. Then, lengthwise opposite end of the printed-circuit board 35 are made with terminals 50 for the power line of the armature windings 7 and sealed up with fillers 28 containing adhesive. The stay 29 has through-holes 34 into which fastening bolts fit to mount the armature assembly 5 to the side of the table 1.

With the armature assembly 5 in which the cores 27 are in one united construction with the common stay 29, as the coil stay 33 is much improved in stiffness or rigidity so as not to incur appreciable bending or deflection caused by any magnetic attraction of the field magnet arrays 6, the coil board 11 may be made thinner in thickness than ever while the stay 29 may hold the coil board 11 at a desired location in the interval 45 between the field magnet arrays 6 with keeping slight spaces away from the field magnet arrays 6. The words "desired location" stated earlier refers the location lying midway between the field magnet arrays 6 to keep magnetic flux in equilibrium on both sides of the cores 27, or the location of the armature windings 7 where cogging, that is, variations in acceleration and speed of the linear motor due to variations in magnetic flux as the cores 27 move past the field magnet arrays 6, is kept less. The stay 29 integral with the cores 27 has stiffness or rigidity enough to make sure of keeping the cores 27 at the desired location. The sliding system 30 of the present invention has high propulsion, smooth sliding performance and high response to provide high speed travel and accurate position control, irrespective of less in cross-sectional height and compact in dimension in transverse section.

Figure 4:
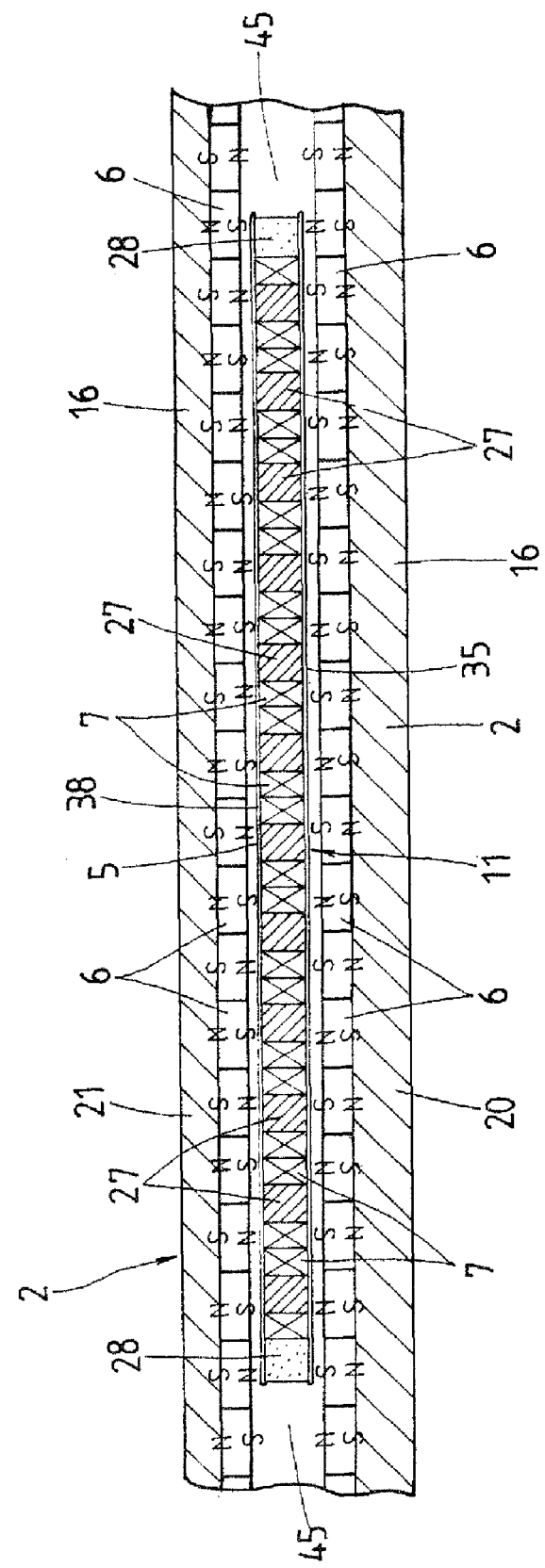
FIG. 4 is a fragmentary view in longitudinal section of the sliding system of FIG. 1, the view being taken along the plane of the line •—• of the same figure.

As shown in FIGS. 3 and 4, the field magnet arrays 6 are installed on the inside surfaces of the magnet yoke 16 opposing each other across a recessed interval 45. Each field magnet array 6 has any number of permanent magnetic poles of rectangular strip, which are placed in close juxtaposition across the overall length of the bed 2 in an orientation their longer sides of rectangle are normal to the lengthwise direction of the bed 2. The magnetic poles are moreover arranged in a way alternating in polarity in a longitudinal direction of the bed 2 and also unlike magnetic poles confront each other across the recessed interval 45. The armature assembly 5 carried on the table 1 includes twelve pieces of the cored flat armature windings 7 lying in the recessed interval 45 defined between the field magnet arrays 6 confronting each other. The cored armature windings 7 are arranged in close juxtaposition lengthwise of the armature assembly 5 in geometry that their sides 37 are normal to the lengthwise direction of the bed 2 while the cores 27 are in opposition to the magnetic poles of the field magnet arrays 6. The armature windings 7 are grouped into armature winding sets each of which corresponds to four magnetic poles of the field magnet arrays 6. Every armature winding sets includes three pieces of armature winding for carrying each phase of U-, V- and W-phases of three-phase conduction system. Now assuming that a winding pitch is Pc and a magnetic pole pitch is Pm, these are made in Pc=(4/3) Pm.

The constructional features of the sliding system constructed as stated earlier are as follows. First, integral combination of every core 27 with the common stay 29 makes it possible to render the coil board 11 of the armature assembly 5 less in thickness than ever. As a result, the coil board 11 is held by virtue of the stay 29 at a desired location in the interval 45 between the field magnet arrays 6 with keeping critical spaces away from the field magnet arrays 6. The sliding system of the present invention has high propulsion, irrespective of less in cross-sectional height and compact in dimension in transverse section. Secondly, the magnet yoke 16 or the bed 2 of angled hook-like configuration in transverse section is made small in height as well as width, eventually compact in transverse dimension. Moreover, the bed 2 can be selected in length at discretion according to the purpose of usage to provide any desirable stroke length for a single table 1 of a preselected length, getting the sliding system convenient for usage.

Figure 11:
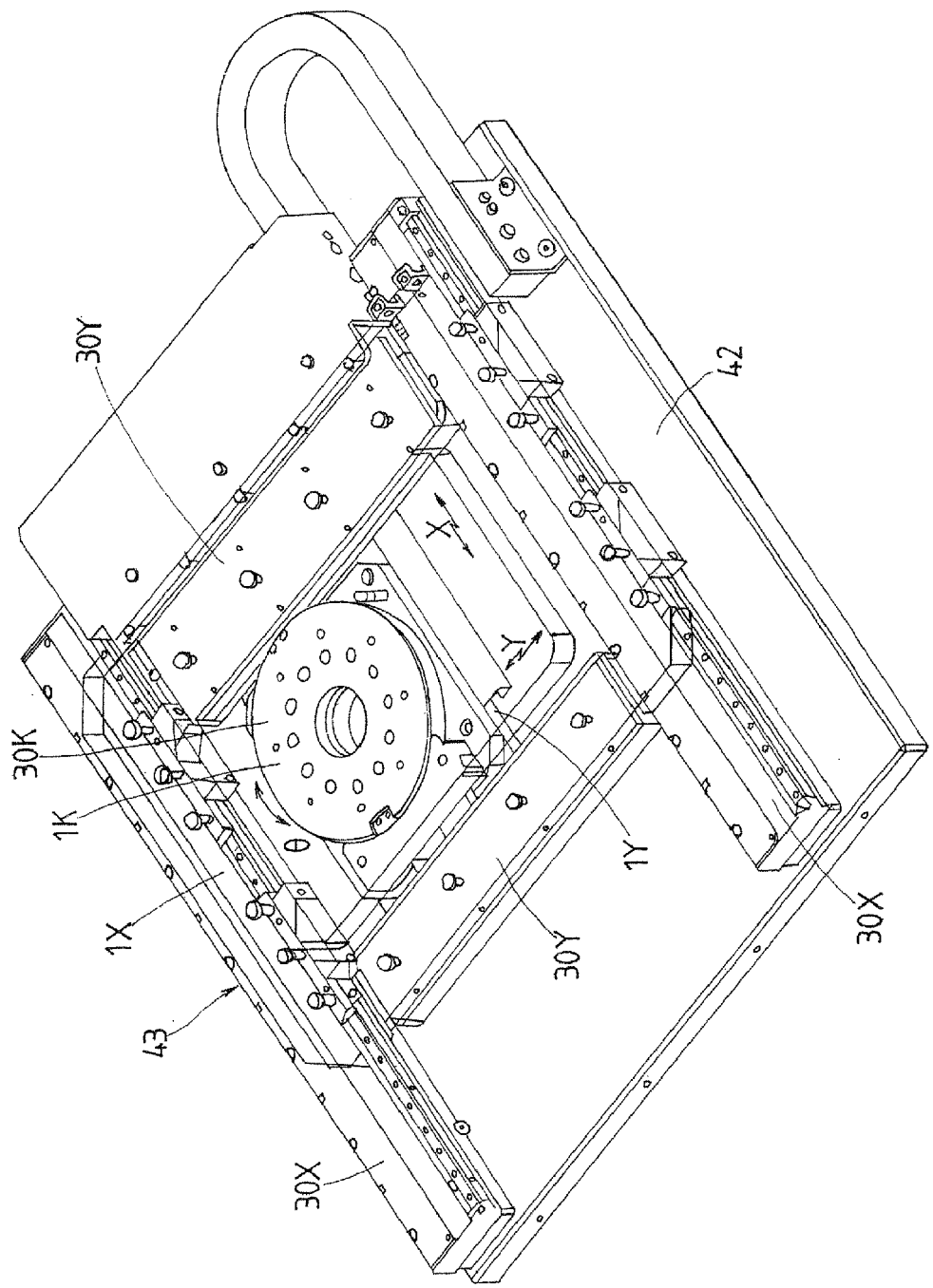
FIG. 11 is a perspective view of X-, Y-, θ-position (XY θ-position) controls having three sets of the sliding systems constructed according to the present invention.

Referring to FIG. 11, there is shown an X-, Y-, θ-position (XY θ-position) control system having incorporated with the sliding system constructed as stated earlier. The X-, Y-, θ-position control system is to move an object such as a workpiece mounted on a θ-table 1K in any of X-direction, Y-direction and circular or θ-direction. This type of position control system is widely used in fields as diverse as semiconductor manufacturing equipments, assembling machines, measurement equipments, and so on, which need to position any object precisely in linear and rotary dimensions. The X-, Y-, θ-position control system 43 is composed of a pair of X-axis sliding systems 30X lying on the machine base 42 in a way extending along opposite sides of the base 42 in parallel with each other, an X-table 1X extending between the X-axis sliding systems 30X, a pair of Y-axis sliding systems 30Y lying underneath the X-table 1X, a Y-table 1Y extending between the Y-axis sliding systems 30Y, and a θ-table 1K lying on the Y-table 1Y and having mounted thereon with a θ-sliding system 30K. The X-table 1X has a configuration like a picture frame and extends in a way riding on the paired X-axis sliding systems 30X for position control in the X-direction. The paired Y-axis sliding systems 30Y are secured to the underneath of the X-table 1X in a relation lying away from each other at a preselected interval between the X-axis sliding systems 30X while extending in parallel with one another. The Y-table 1Y is laid underneath the X-table 1X to extend between the Y-axis sliding systems 30Y. The paired Y-axis sliding systems 30Y are to actuate the Y-table 1Y for position control in the Y-direction. Moreover, the θ-table 1K is actuated for position control in a circular direction or θ-direction. With the X-, Y-, θ-position control system 43 in which the Y-table 1Y is laid underneath the X-table 1X while the θ-table 1K is placed on the Y-table 1Y, the position control of the object such as a workpiece and so on can be carried out in any of X-direction, Y-direction and circular or θ-direction. Thus, the sliding system with onboard moving-coil linear motor constructed according to the present invention after installed in the X-, Y-, θ-position control system is effective in position control of any object such as workpiece across long distance or length, and advantageous in shrinkage or compactness of the position control system in transverse section.

What is claimed is:

1. A sliding system with onboard moving-coil linear motor, comprising an elongated bed functioning as a magnet yoke, a table movable for reciprocating motion in a lengthwise direction of the elongated bed by virtue of a linear motion guide unit, a pair of field magnet arrays lying inside surfaces of the magnet yoke opposite to one another, the paired field magnet arrays having magnetic poles which are laid on the inside surfaces of the magnet yoke in a way unlike magnetic poles are juxtaposed alternately in polarity in the lengthwise direction of the elongated bed and also any one magnetic pole on one inside surface of the magnet yoke confronts unlike magnetic pole on the other surface of the magnet yoke, and an armature assembly having armature windings carried on the table to hold a location lying in an interval defined between the field magnet arrays so that a current in the armature windings interacts electromagnetically with a field flux created by the field magnet arrays to force the table moving relatively to the bed;

wherein the armature assembly is comprised of a coil board having a printed-circuit board of flat configuration lying between the field magnet arrays and the armature windings lying on the printed-circuit board in juxtaposition in a lengthwise direction of the printed-circuit board, and a coil stay having a stay secured to a side of the table and locate out of the interval between the field magnet arrays and magnetic cores integral with the stay and extended into winding turns of the armature windings to fit inside the winding turns of the armature windings, so that the coil board is carried on the table through the coil stay, wherein the cores of the coil stay are laid in juxtaposition in the lengthwise direction in a way any adjacent two are spaced away from each other across a preselected interval and joined together to the stay at their root ends to make the coil stay into a comb-like construction;

wherein the armature winding contains winding turns wound in an elliptic configuration each of which has a pair of coil sides lying in parallel with one another to generate electromotive propulsion and curved coil ends connecting the coil sides together, and the armature winding fitting over the core of the coil stay;

the bed has an angled configuration like a hook in a transverse section normal to the lengthwise direction of the bed, the angled hook-like configuration being constituted with a base board of rectangle extending lengthwise of the bed, a ceiling board of rectangle lying in parallel and opposition to the base board at a preselected interval away from the base board, the ceiling board being same in length as the base board, but less in width than the base board, and a side board joining integrally the base board and the ceiling board at their lengthwise side edges, and wherein the inside surfaces of the base and ceiling boards opposite to one another across the preselected interval have mounted thereon with the field magnet arrays, and the inside surface of the base board extends sidewise into a shelf lying along a lengthwise other edge widthwise opposite to a joined edge of the base board with the side board to provide a mounting surface for the linear motion guide unit; and wherein the linear motion guide unit is comprised of a guide rail secured to the bed in a way extending along the lengthwise direction of the bed, and sliders that fit over or conform to the guide rail for sliding movement by virtue of more than one rolling element, and the table is fastened to the sliders and has mounted on one side thereof with the stay of the armature assembly.

* * * * *